(12) United States Patent
Gimblet et al.

(10) Patent No.: US 12,124,090 B2
(45) Date of Patent: Oct. 22, 2024

(54) OPTICAL CABLE ASSEMBLIES HAVING FILLER OPTICAL FIBERS AND METHODS OF FABRICATING THE SAME

(71) Applicant: Corning Research & Development Corporation, Corning, NY (US)

(72) Inventors: Michael John Gimblet, Conover, NC (US); Alvin John McDonald, Lenoir, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 272 days.

(21) Appl. No.: 17/877,010

(22) Filed: Jul. 29, 2022

(65) Prior Publication Data

US 2024/0036270 A1 Feb. 1, 2024

(51) Int. Cl.
*G02B 6/38* (2006.01)

(52) U.S. Cl.
CPC ........... *G02B 6/3859* (2013.01); *G02B 6/381* (2013.01); *G02B 6/3874* (2013.01)

(58) Field of Classification Search
CPC ..... G02B 6/3859; G02B 6/381; G02B 6/3874
See application file for complete search history.

(56) References Cited

U.S. PATENT DOCUMENTS

| 5,636,310 A | 6/1997 | Walles |
| 7,429,136 B2 | 9/2008 | Lewallen et al. |
| 9,810,857 B2 | 11/2017 | Cervantes et al. |
| 9,915,792 B2 | 3/2018 | Cervantes et al. |
| 9,989,711 B2 | 6/2018 | Ott et al. |
| 2007/0110384 A1 | 5/2007 | Cody et al. |
| 2008/0101751 A1 | 5/2008 | Luther et al. |
| 2017/0168247 A1* | 6/2017 | Watanabe ............ G02B 6/3839 |
| 2018/0129010 A1 | 5/2018 | Caldwell et al. |

FOREIGN PATENT DOCUMENTS

EP 3521880 B1 9/2020

* cited by examiner

*Primary Examiner* — Sung H Pak
*Assistant Examiner* — Hoang Q Tran
(74) *Attorney, Agent, or Firm* — Michael E. Carroll, Jr.

(57) ABSTRACT

Optical cable assemblies having filler optical fibers and methods of fabricating the same are disclosed. In one embodiment, an optical cable assembly includes an optical cable, a plurality of filler optical fibers, and a ferrule. The optical cable includes an outer jacket and a plurality of active optical fibers disposed within the outer jacket, wherein the plurality of active optical fibers extend beyond an end of the outer jacket. Each filler optical fiber includes a first end and second end. The first end is secured to an outer surface of the outer jacket by a securing member for improving mechanical performance of the assembly. The ferrule includes an array of openings. Ends of the plurality of active optical fibers are disposed within a first subset of openings of the array of openings and the second ends of the plurality of filler optical fibers are disposed within a second subset of openings of the array of openings and are suitable for transmitting optical signals.

33 Claims, 8 Drawing Sheets

OPTICAL CABLE ASSEMBLIES HAVING FILLER OPTICAL FIBERS AND METHODS OF FABRICATING THE SAME

FIELD

The disclosure is directed to optical cable assemblies and, more particularly, to optical cable assemblies that employ filler optical fibers with the first ends of the filler optical fibers secured to a jacket and a second end of the filler optical fibers disposed within a ferrule, thereby providing improved mechanical performance.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G, and the like. As optical fiber extends deeper into communication networks there exists a need for building more complex and flexible fiber optic networks in a quick and easy manner.

A multi-fiber optical connector typically employs a ferrule that holds multiple optical fibers at desired locations so that the optical fibers may be optically coupled to a mated optical connector or receptacle for optical communication in the network. The optical fibers within the optical connector extend beyond a protective outer jacket that prevents bending of the optical fibers. The bending of optical fibers carrying the optical signals may cause optical attenuation, which degrades optical performance for the assembly. Because the optical fibers are free to move within the optical connector, they may become bent, or inadvertently pulled out of the bores of the ferrule, particularly when a connector housing is pulled over the optical fibers and the ferrule during cable assembly. The bending of optical fibers carrying optical signals may cause the optical connector to not perform within specifications, and optical fibers that are pulled out of the ferrule render these optical fiber disposed in the optical connector inoperable.

Thus, alternative optical cable assemblies and fabrication methods that prevent bending of optical fibers and provide strain relief may be desired for preserving optical performance of the assembly.

SUMMARY

Embodiments of the present disclosure are directed to optical cable assemblies and their fabrication wherein a plurality of filler optical fibers are inserted into unused bore positions of a ferrule and secured to a component of an optical cable, such as an outer jacket or one or more buffer tubes. The filler optical fibers are mechanically attached, and do not provide an operable optical communication pathway to the optical cable for transmitting optical signals. The presence of the plurality of filler optical fibers assist in maintaining a plurality of active optical fibers that are suitable for transmitting optical signals in a straight orientation to minimize attenuation, as well as provide strain relief for the optical cable and the ferrule.

In one embodiment, an optical cable assembly includes an optical cable, a plurality of filler optical fibers, and a ferrule. The optical cable includes an outer jacket and a plurality of active optical fibers disposed within the outer jacket, wherein the plurality of active optical fibers extend beyond an end of the outer jacket. Each filler optical fiber includes a first end and second end. The first end is secured to an outer surface of the outer jacket by a securing member. The ferrule includes an array of openings. Ends of the plurality of active optical fibers are disposed within a first subset of openings of the array of openings and the second ends of the plurality of filler optical fibers are disposed within a second subset of openings of the array of openings.

In another embodiment, an optical cable assembly includes an optical cable, a plurality of filler optical fibers, and a ferrule. The optical cable includes an outer jacket, one or more buffer tubes disposed within the outer jacket, wherein the one or more buffer tubes extend beyond an end of the outer jacket, and a plurality of active optical fibers disposed within the one or more buffer tubes. The plurality of active optical fibers extend beyond an end of the one or more buffer tubes. Each filler optical fiber includes a first end and second end. The first end is secured to an outer surface of the one or more buffer tubes by a securing member. The ferrule includes an array of openings. Ends of the plurality of active optical fibers are disposed within a first subset of openings of the array of openings and the second ends of the plurality of filler optical fibers are disposed within a second subset of openings of the array of openings.

In yet another embodiment, an optical cable assembly includes a housing, an optical cable, a plurality of filler optical fibers, and a ferrule. The optical cable includes an outer jacket and a plurality of active optical fibers disposed within the outer jacket, wherein the plurality of active optical fibers extend beyond an end of the outer jacket and a portion of the optical cable is disposed within the housing. Each filler optical fiber includes a first end and second end. The first end is secured to an outer surface of the outer jacket by a securing member. The ferrule includes an array of openings. The ferrule is disposed within the housing, and ends of the plurality of active optical fibers are disposed within a first subset of openings of the array of openings and the second ends of the plurality of filler optical fibers are disposed within a second subset of openings of the array of openings.

In yet another embodiment, an optical cable assembly includes a housing, an optical cable, a plurality of filler optical fibers, and a ferrule. The optical cable includes an outer jacket, one or more buffer tubes disposed within the outer jacket, wherein the one or more buffer tubes extend beyond an end of the outer jacket, and a plurality of active optical fibers disposed within the one or more buffer tubes. The plurality of active optical fibers extend beyond an end of the one or more buffer tubes and at least a portion of the optical cable is disposed within the housing. Each filler optical fiber includes a first end and second end. The first end is secured to an outer surface of the one or more buffer tubes by a securing member. The ferrule includes an array of openings. The ferrule is disposed within the housing, and ends of the plurality of active optical fibers are disposed within a first subset of openings of the array of openings and the second ends of the plurality of filler optical fibers are disposed within a second subset of openings of the array of openings.

In yet another embodiment, a method of securing a ferrule to a plurality of optical fibers of an optical cable includes stripping an outer jacket of the optical cable to expose a plurality of active optical fibers, reducing a diameter of the outer jacket at an end portion proximate an end of the outer jacket, securing ends of a plurality of filler optical fibers to the end portion of the outer jacket, and inserting the plurality of filler optical fibers and the plurality of active optical fibers into openings of the ferrule.

In yet another embodiment, a method of securing a ferrule to a plurality of optical fibers of an optical cable includes stripping an outer jacket of the optical cable to expose one or more buffer tubes, stripping the one or more buffer tubes to expose a plurality of active optical fibers, securing ends of a plurality of filler optical fibers to the one or more buffer tubes, and inserting the plurality of filler optical fibers and the plurality of active optical fibers into openings of the ferrule.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The drawings illustrate various embodiments and together with the description serve to explain the principles and operation.

DETAILED DESCRIPTION

References will now be made in detail to the embodiments of the disclosure, examples of which are illustrated in the accompanying drawings. Whenever possible, like reference numbers will be used to refer to like components or parts.

Embodiments of the present disclosure are directed to optical cable assemblies and their fabrication. In embodiments, a plurality of filler optical fibers are inserted into unused bore positions of a ferrule and secured to a component of an optical cable, such as an outer jacket or one or more buffer tubes. Consequently, the filler optical fibers provide mechanical attachment without the ability to transmit optical signals since the ends of the filler optical fibers dead end when secured to the component of the optical cable. The presence of the plurality of filler optical fibers assist in maintaining a plurality of active optical fibers in a straight orientation for preserving the optical performance of the optical fibers that are suitable for transmitting optical signals. When optical fibers that transmit optical signals become bent, undesirable attenuation of optical signals may occur. As an example, when positioning the optical fibers and ferrule into a connector housing, the active optical fibers may become bent. The presence of the plurality of filler optical fibers minimizes bending because more force is needed to bend the larger bundle of optical fibers. The plurality of filler optical fibers also provide strain relief for the optical cable and the ferrule, which may be desirable particularly when inserted the plurality of optical fibers and the ferrule into a connector housing. As used herein, "active optical fibers" are suitable for transmitting optical signals in the assembly if desired, and "filler optical fibers" are not suitable for transmitting optical signals in the assembly.

Various embodiments of optical cable assemblies and methods of fabricating the same are described in detail below.

Figure 1:
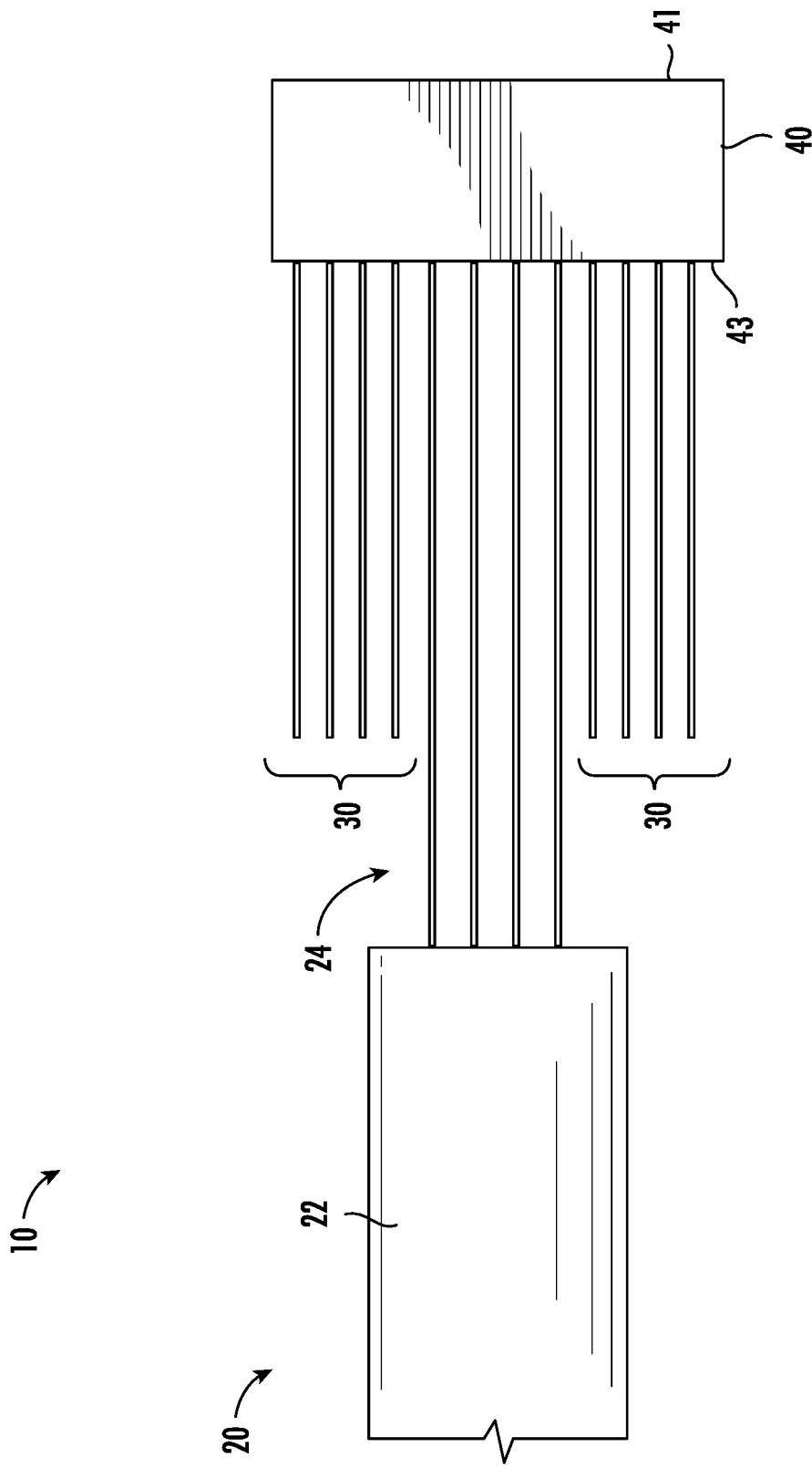
FIG. 1 illustrates an example optical cable assembly prior to attachment of filler optical fibers to an optical cable according to one or more embodiments of the present disclosure.

Referring now to FIG. 1, an example optical cable assembly 10 is illustrated. Generally, the optical cable assembly 10 comprises an optical cable 20, a multi-fiber ferrule 40, and a plurality of filler optical fibers 30. It is noted that FIG. 1 illustrates the optical cable assembly 10 prior to securing the plurality of filler optical fibers 30 to the optical cable 20.

The optical cable 20 comprises an outer jacket 22 and a plurality of active optical fibers 24 disposed within the outer jacket 22. Embodiments are not limited to any particular type of optical cable. The optical cable 20 may include other components that are not illustrated, such as strength members (e.g., aramid yarn, glass reinforced plastic, and the like) and buffer tubes that surround one or more active optical fibers 24.

The outer jacket 22 may be made from any suitable material that protects the plurality of active optical fibers 24 disposed therein, such as, without limitation, a polymer. The plurality of active optical fibers 24 may be any known or yet-to-be-developed optical fiber for optical communication. Although FIG. 1 illustrates four active optical fibers 24, it should be understood that more or fewer active optical fibers 24 may be disposed within the outer jacket.

As shown in FIG. 1, the plurality of active optical fibers 24 extend beyond an end of the outer jacket 22 so that they may be inserted into bores of a multi-fiber ferrule 40.

Figure 2:
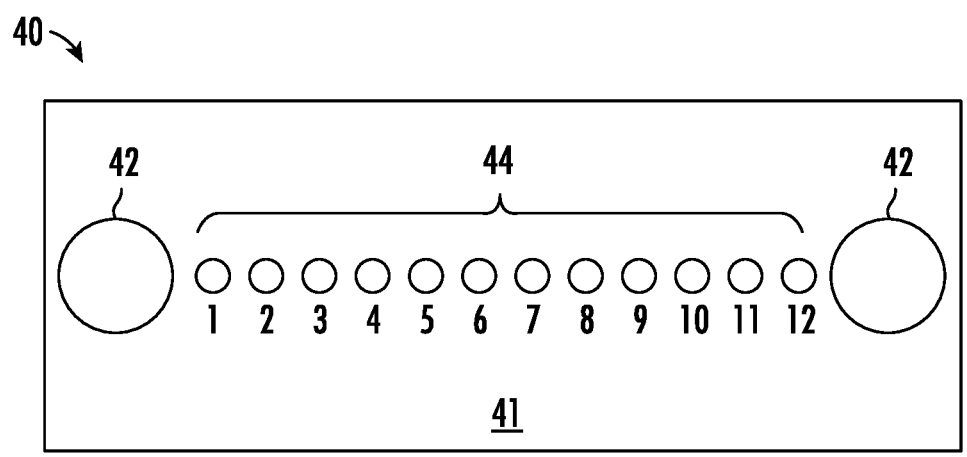
FIG. 2 illustrates a front view of an example ferrule according to one or more embodiments of the present disclosure.

Referring now to FIG. 2, a front face 41 of an example multi-fiber ferrule 40 (hereinafter referred to as a "ferrule") is illustrated. The ferrule 40 has an array of bores 44 operable to receive optical fibers. The array of bores 44 are disposed between two connector mating features 42, which may be configured as a bore or a pin for mating with a mated connector or receptacle. The example of FIG. 2 illustrates an array of bores that is defined by a single row; however, it should be understood that more than one row of bores may be utilized. As a non-limiting example, the ferrule 40 may be configured as a multi-fiber ferrule suitable for use in a multi-fiber push on connector (MPO). Any type of multi-fiber ferrule may be utilized as a ferrule 40.

Certain applications may utilize a ferrule 40 having more bores 44 than active optical fibers 24 that are used for optical communication, as shown in FIG. 1. In the illustrated example only four of the twelve bores 44 receive active optical fibers 24. Referring to FIG. 2, the four active optical fibers 24 are disposed in positions 5-8 of the array of bores 44. Positions 5-8 define a first subset of the array of bores 44. No signals pass through positions 1-4 and 9-12, which define a second subset of the array of bores 44. To keep the fully assembled optical connector assembly environmentally sealed, in embodiments of the present disclosure, filler optical fibers 30 are disposed in the unused bores 44 of the ferrule 40. In the illustrated embodiment, there are two sets of four filler optical fibers 30 that are disposed in positions 1-4 and 9-12 of the bores 44 of the ferrule No optical signals pass through the filler optical fibers, which act as "dummy" optical fibers. It should be understood that more or fewer filler optical fibers and active optical fibers may be provided. The use of the filler optical fibers reduces the risk of the active optical fibers being positioned in an incorrect boor of the ferrule 40.

There is a desire to have the plurality of active optical fibers 24 straight when the ferrule 40 is assembled in the connector housing 60 (see FIG. 9, described below) so that acceptable attenuation and long-term reliability is maintained. Bending of the active optical fibers 24 causes optical attenuation which may adversely affect optical communication. Further, there is a desire to provide strain relief for the active optical fibers 24 that are attached to the ferrule 40, particularly during installation of the ferrule 40 onto the active optical fibers 24 and installation of the ferrule 40 into the connector housing 60.

Embodiments of the present disclosure use a plurality of filler optical fibers 30 to assist in keeping the plurality of active optical fibers 24 in a straight orientation as well as provide strain relief for the optical cable assembly 10. The phrase "filler optical fibers" means that no optical signals pass through the optical fibers.

Figure 3:
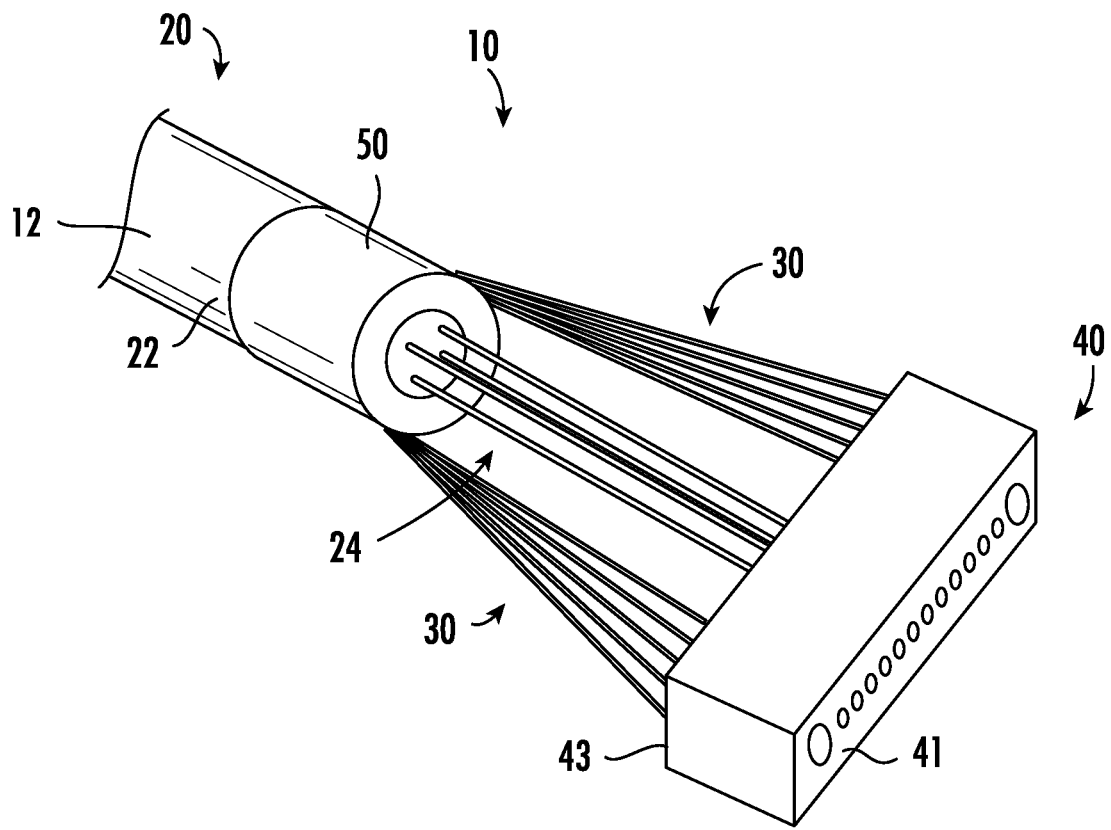
FIG. 3 illustrates a perspective view of an example optical cable assembly including a plurality of filler optical fibers according to one or more embodiments of the present disclosure.
Figure 4:
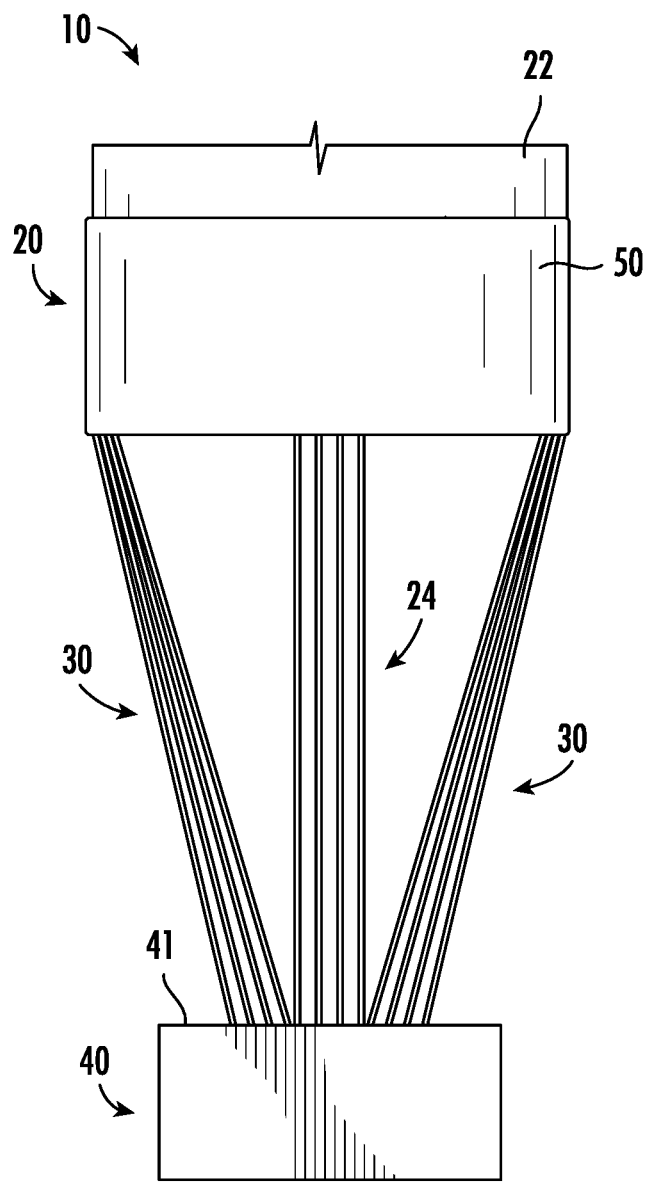
FIG. 4 illustrates a top view of the example optical cable assembly illustrated by FIG. 3 according to one or more embodiments described and illustrated herein.

FIGS. 3 and 4 illustrate a perspective view and a top view, respectively, of an example optical cable assembly 10 utilizing a plurality of filler optical fibers 30 that are secured to the outer jacket 22 of the optical cable 20. Two sets of filler optical fibers 30 are secured to the outer jacket 22 by a heat shrink tubing 50 in the illustrated example. In the illustrated example, the plurality of filler optical fibers 30 comprises two sets of four filler optical fibers 30. The plurality of filler optical fibers 30 may be positioned on the outer surface of the outer jacket 22 and then the heat shrink tubing 50 disposed over the plurality of filler optical fibers 30 and the outer jacket 22. Heat is then applied to shrink the heat shrink tubing 50 to secure the plurality of filler optical fibers 30 to the outer jacket 22.

Additionally or alternatively, an adhesive, such as a UV curable adhesive, may be used to secure the plurality of filler optical fibers 30 to the outer jacket 22.

The plurality of active optical fibers 24 and the plurality of filler optical fibers 30 are then inserted into the bores 44 of the ferrule 40 in their respective positions. In the illustrated embodiment, the plurality of active optical fibers are disposed in the bores 44 of positions five through eight and the plurality of filler optical fibers 30 are disposed in the bores 44 of positions 1-4 and 9-12. It should be understood that other configurations are possible.

The addition of the plurality of filler optical fibers 30 provides a larger overall fiber bundle, which prevents bending of the plurality of active optical fibers 24 and thereby reduces attenuation. Additionally, as the plurality of filler optical fibers 30 do not extend into the optical cable 20, attachment of the filler optical fibers 30 to the outer jacket 22 provides strain relief for the optical cable 20 and ferrule 40.

In some applications, it may be desirable to keep the outer diameter of the optical cable 20 below a threshold diameter so that it may be inserted into a connector housing 60. The heat shrink tubing 50 and plurality of filler optical fibers 30 increase the outer dimension of the optical cable 20, which may prevent the optical cable 20 from being inserted into the connector housing 60.

Thus, in some embodiments, the outer diameter of the optical cable 20 may be reduced at an end portion to accommodate the plurality of filler optical fibers 30 and the heat shrink tubing 50 and/or adhesive. The outer diameter of the optical cable 20 may be mechanically reduced by a tool that shaves or otherwise removes an outer portion of the outer jacket 22. Any method of removing material from the outer jacket 22 may be utilized.

Figure 5:
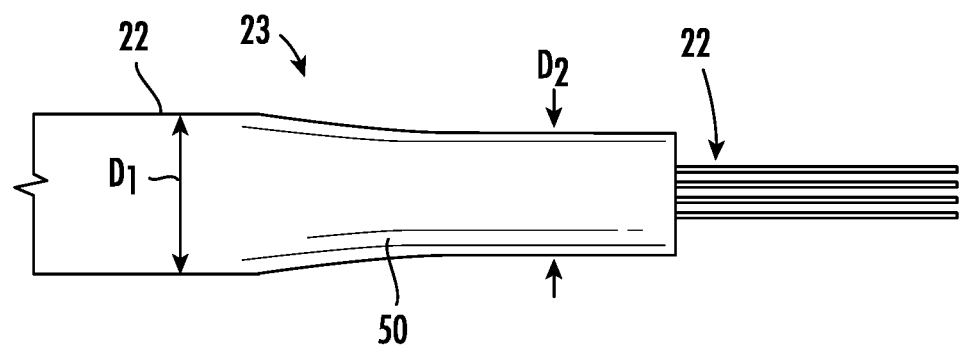
FIG. 5 illustrates a side view of an example optical cable having an end portion with a reduced diameter according to one or more embodiments described and illustrated herein.
Figure 6:
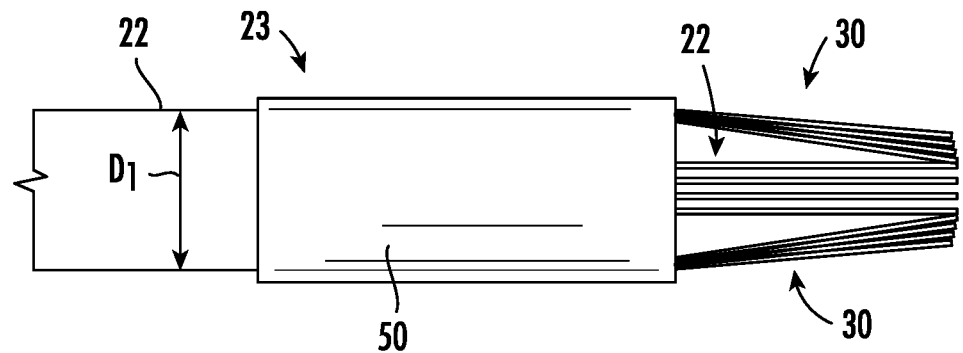
FIG. 6 illustrates the example optical cable illustrated by FIG. 5 after securing a plurality of filler optical fibers to the end portion of the optical cable by a heat shrink tubing according to one or more embodiments described and illustrated herein.

FIG. 5 illustrates an example optical cable 20 wherein an end portion 23 of the optical cable 20 has a diameter D2 that is smaller than the outer diameter $D_1$ of the optical cable 20 that are outside of the end portion 23. FIG. 6 illustrates how the outer diameter $D_1$ of the optical cable 20 is maintained after securing the plurality of filler optical fibers 30 and the heat shrink tubing (and/or adhesive) to the end portion 23 of the outer jacket 22.

The embodiments described herein may be used with any type of optical cable. Some optical cables include one or more buffer tubes within the outer jacket that maintain one or more optical fibers. As a non-limiting example, a single buffer tube, which may be made from a polymer material, may maintain a single optical fiber therein. As another example, a single buffer tube may maintain more than one optical fiber.

Figure 7:
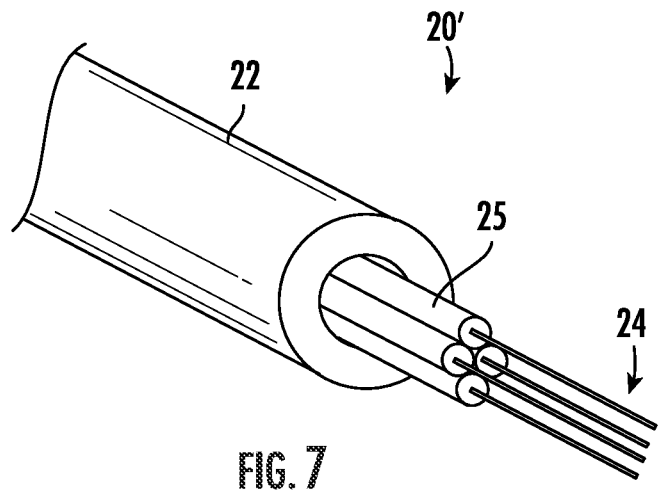
FIG. 7 illustrates a perspective view of an example optical cable having a plurality of buffer tubes according to one or more embodiments described and illustrated herein.

FIG. 7 illustrates another example optical cable 20' comprising a plurality of buffer tubes 25. Each buffer tube 25 maintains a single active optical fiber 24. It should be understood that more or fewer than four buffer tubes 25 and active optical fibers 24 may be used depending on the type of optical cable. The buffer tubes 25 provide an attachment location for a plurality of filler optical fibers 30 in a manner similar to the outer jacket 22.

Figure 8:
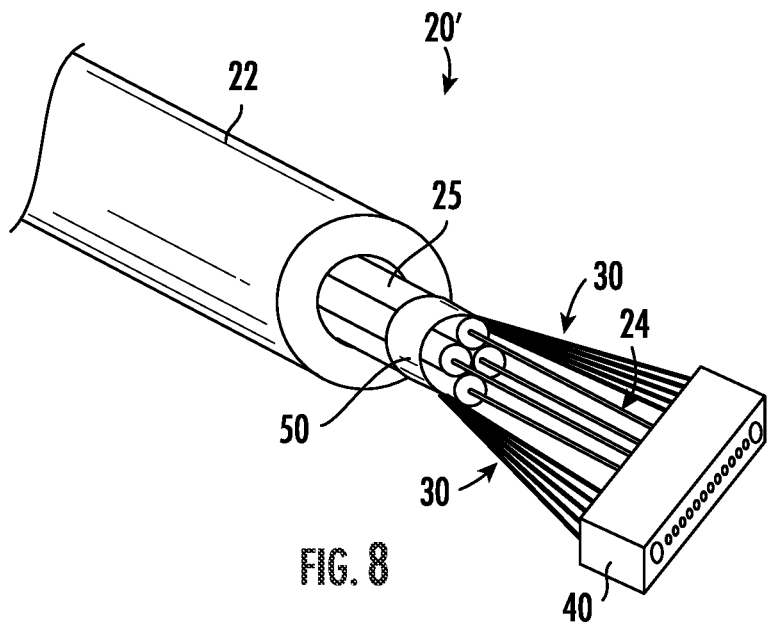
FIG. 8 illustrates an example optical cable assembly having a plurality of filler optical fibers secured to the plurality of buffer tubes of the optical cable illustrated by FIG. 7 according to one or more embodiments described and illustrated herein.

FIG. 8 illustrates an example optical cable assembly 10' wherein a plurality of filler optical fibers 30 are secured to a plurality of buffer tubes 25 by a heat shrink tubing (and/or adhesive). The plurality of filler optical fibers 30 assist in keeping the plurality of active optical fibers 24 in a straight orientation as well as provide strain relief for the optical cable assembly 10'.

It is noted that it may be advantageous to attach the plurality of filler optical fibers 30 to the one or more buffer tubes 25 if they are present because doing so may eliminate the step of reducing the diameter of the outer jacket 22.

The ferrule 40, the plurality of filler optical fibers, and the optical cable 20 may be disposed in a connector housing. Embodiments are not limited to any particular connector housing and may therefore may be used in a wide variety of connector applications. As a non-limiting example, the embodiments described herein may be employed in an OptiTip® connector sold by Corning Optical Communications of Charlotte, NC.

Figure 9:
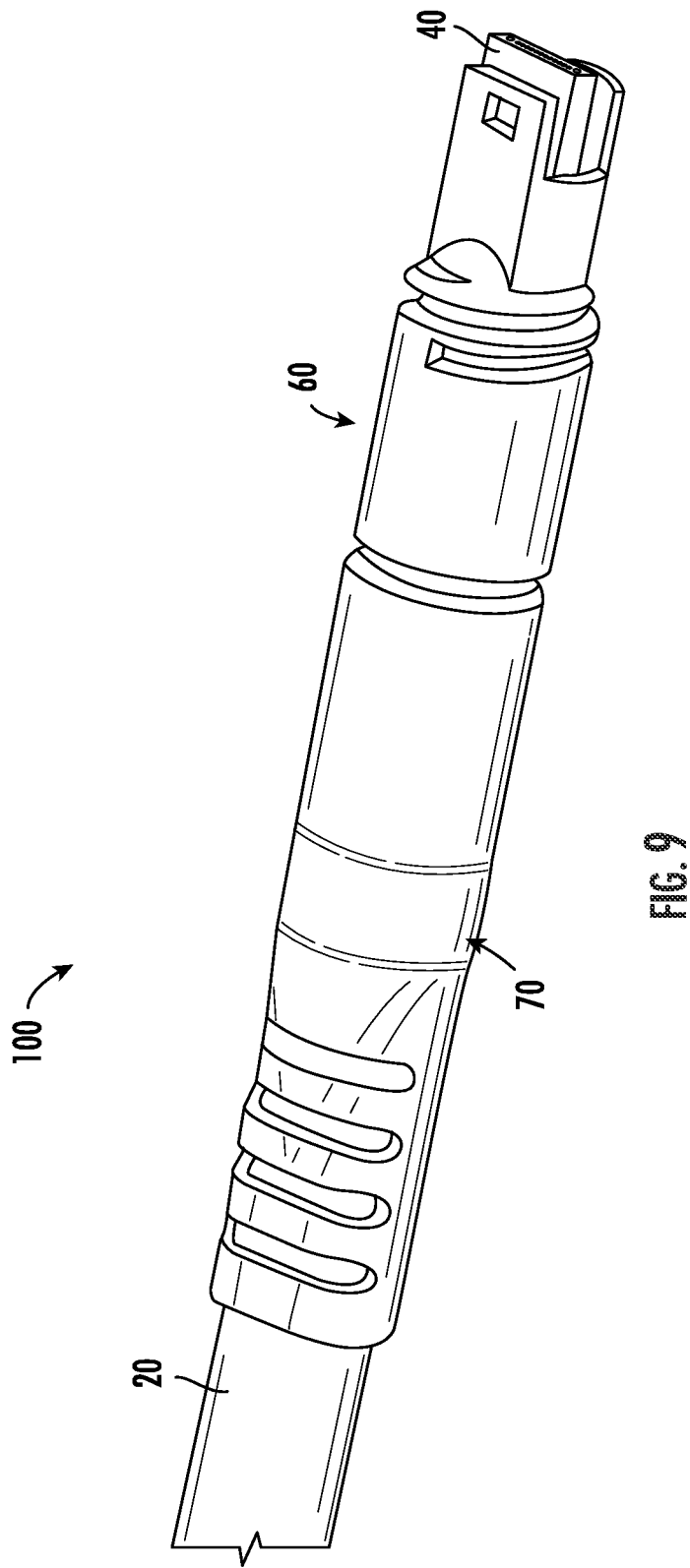
FIG. 9 illustrates an example optical cable assembly having a ferrule disposed in a connector housing according to one or more embodiments described and illustrated herein.

FIG. 9 illustrates a non-limiting OptiTap® style hardened optical connector. After securing the plurality of active optical fibers 24 and the plurality of filler optical fibers 30 to the ferrule 40, and also attaching the plurality of filler optical fibers 30 to the outer jacket 22 or one or more buffer tubes 25, the ferrule 40 and the end of the optical cable 20 having the plurality of filler optical fibers 30 is disposed in a connector housing and a boot 70. The connector housing 60 and the boot 70 may be disposed over the optical cable 20 prior to attaching the ferrule 40 to the plurality of active optical fibers 24. The connector housing 60 and boot 70 may then be slid over the end of the optical cable such that the ferrule 40 is installed in the connector housing 60 as shown in FIG. 9.

Figure 10:
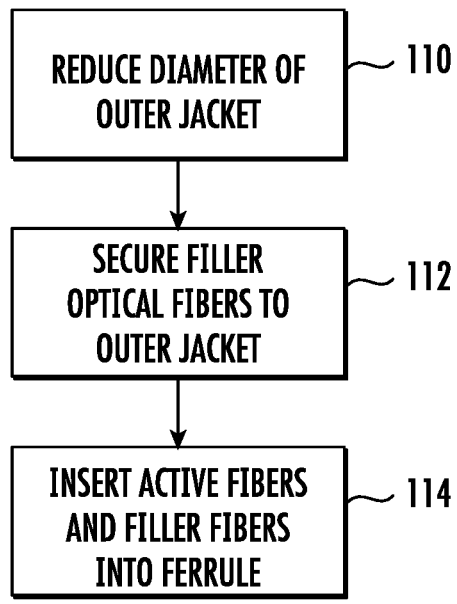
FIG. 10 illustrates an example method of fabricating an optical cable assembly according to one or more embodiments described and illustrated herein.

Embodiments of the present disclosure are also directed toward methods assembling an optical cable assembly. FIG. 10 illustrates a flowchart of an example method of assembling an optical cable assembly. At block 110, the diameter of the outer jacket 22 of the optical cable 20 is reduced. It is noted that prior to block 110, the outer jacket has been stripped to expose a plurality of active optical fibers 24. A connector housing 60 and boot 70 may also be disposed over the optical cable 20 prior to block 110. The reduced diameter of the outer jacket 22 provides clearance for securing a plurality of filler optical fibers 30 and a heat shrink tubing (and/or adhesive) to the outer jacket 22.

At block 112, a plurality of filler optical fibers 30 is secured to the portion of the outer jacket 22 having a reduced diameter. The plurality of filler optical fibers 30 may be secured to the outer jacket 22 using a heat shrink tubing 50. In another embodiment, the plurality of filler optical fibers 30 may be secured to the outer jacket 22 using an adhesive. In another embodiment, the plurality of filler optical fibers 30 may be secured to the outer jacket 22 using both adhesive and a heat shrink tubing 50.

Next, at block 114, a plurality of active optical fibers 24 of the optical cable 20 and the plurality of filler optical fibers 30 are inserted into bores 44 of a ferrule 40 at the respective positions. The plurality of active optical fibers 24 and the plurality of filler optical fibers 30 may be secured within the bores 44 of the ferrule by an adhesive, for example. The optical cable 20 and the ferrule 40 are ready for further processing, such as insertion into a connector housing 60, for example.

Figure 11:
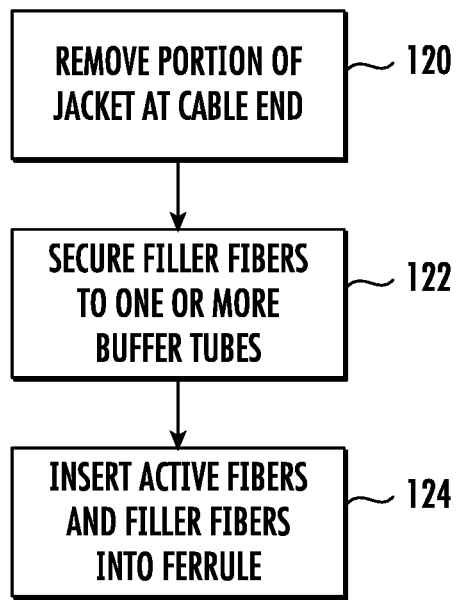
FIG. 11 illustrates another example method of fabricating an optical cable assembly according to one or more embodiments described and illustrated herein.

FIG. 11 illustrates a flowchart of another example method for assembling an optical cable assembly. At block 120, an end portion of an outer jacket 22 of an optical cable 20 is removed to expose one or more buffer tubes 25 that maintain one or more active optical fibers 24. The end portion of the outer jacket 22 may be removed by a stripping tool, for example. The one or more buffer tubes 25 are also stripped to expose the active optical fibers 24 in this step.

At block 122, a plurality of filler optical fibers 30 is secured to the one or more buffer tubes 25. The plurality of filler optical fibers 30 may be secured to the one or more buffer tubes 25 using a heat shrink tubing 50. In another embodiment, the plurality of filler optical fibers 30 may be secured to the one or more buffer tubes 25 using an adhesive. In another embodiment, the plurality of filler optical fibers 30 may be secured to the one or more buffer tubes 25 using both adhesive and a heat shrink tubing 50.

Next, at block 124, a plurality of active optical fibers 24 of the optical cable 20 and the plurality of filler optical fibers 30 are inserted into bores 44 of a ferrule 40 at the respective positions. The plurality of active optical fibers 24 and the plurality of filler optical fibers 30 may be secured within the bores 44 of the ferrule by an adhesive, for example. The optical cable 20 and the ferrule 40 are ready for further processing, such as insertion into a connector housing 60, for example.

It should now be understood that embodiments of the present disclosure are directed to optical cable assemblies and their fabrication wherein a plurality of filler optical fibers are inserted into unused bore positions of a ferrule and secured to a component of an optical cable, such as an outer jacket or one or more buffer tubes. The presence of the plurality of filler optical fibers assist in maintaining a plurality of active optical fibers in a straight orientation to minimize attenuation, as well as provide strain relief for the optical cable and the ferrule.

It is noted that recitations herein of a component of the embodiments being "configured" in a particular way, "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that one or more of the following claims utilize the term "wherein" as a transitional phrase. For the purposes of defining the embodiments of the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

The invention claimed is:

1. An optical cable assembly comprising:
   an optical cable comprising:
      an outer jacket; and
      a plurality of active optical fibers disposed within the outer jacket, wherein the plurality of active optical fibers extend beyond an end of the outer jacket;
   a plurality of filler optical fibers, each filler optical fiber comprising a first end and second end, wherein the first end is secured to an outer surface of the outer jacket by a securing member; and
   a ferrule comprising an array of openings, wherein ends of the plurality of active optical fibers are disposed within a first subset of openings of the array of openings and the second ends of the plurality of filler optical fibers are disposed within a second subset of openings of the array of openings.

2. The optical cable assembly of claim 1, wherein the securing member comprises an adhesive.

3. The optical cable assembly of claim 1, wherein the securing member comprises a heat shrink tubing.

4. The optical cable assembly of claim 3, wherein the securing member further comprises an adhesive.

5. The optical cable assembly of claim 1, wherein the first subset of openings is in a central position of the array of openings.

6. The optical cable assembly of claim 1, wherein:
the outer jacket comprises an end portion proximate the end of the outer jacket; and
the end portion has an outer diameter that is less than an outer diameter of the outer jacket outside of the end portion.

7. The optical cable assembly of claim 6, wherein the first ends of the plurality of filler optical fibers are disposed between the end portion of the outer jacket and the securing member.

8. An optical cable assembly comprising:
an optical cable comprising:
an outer jacket;
one or more buffer tubes disposed within the outer jacket, wherein the one or more buffer tubes extend beyond an end of the outer jacket; and
a plurality of active optical fibers disposed within the one or more buffer tubes, wherein the plurality of active optical fibers extend beyond an end of the one or more buffer tubes;
a plurality of filler optical fibers, each filler optical fiber comprising a first end and second end, wherein the first end is secured to an outer surface of the one or more buffer tubes by a securing member; and
a ferrule comprising an array of openings, wherein ends of the plurality of active optical fibers are disposed within a first subset of openings of the array of openings and the second ends of the plurality of filler optical fibers are disposed within a second subset of openings of the array of openings.

9. The optical cable assembly of claim 8, wherein the securing member comprises an adhesive.

10. The optical cable assembly of claim 8, wherein the securing member comprises a heat shrink tubing.

11. The optical cable assembly of claim 10, wherein the securing member further comprises an adhesive.

12. The optical cable assembly of claim 8, wherein the first subset of openings is in a central position of the array of openings.

13. The optical cable assembly of claim 8, wherein the one or more buffer tubes comprises a plurality of buffer tubes, and a single active optical fiber of the plurality of active optical fibers is disposed within a single buffer tube of the plurality of buffer tubes.

14. An optical cable assembly comprising:
a housing;
an optical cable comprising:
an outer jacket; and
a plurality of active optical fibers disposed within the outer jacket, wherein the plurality of active optical fibers extend beyond an end of the outer jacket and a portion of the optical cable is disposed within the housing;
a plurality of filler optical fibers, each filler optical fiber comprising a first end and second end, wherein the first end is secured to an outer surface of the outer jacket by a securing member; and
a ferrule comprising an array of openings, wherein the ferrule is disposed within the housing, and ends of the plurality of active optical fibers are disposed within a first subset of openings of the array of openings and the second ends of the plurality of filler optical fibers are disposed within a second subset of openings of the array of openings.

15. The optical cable assembly of claim 14, wherein the securing member comprises an adhesive.

16. The optical cable assembly of claim 14, wherein the securing member comprises a heat shrink tubing.

17. The optical cable assembly of claim 16, wherein the securing member further comprises an adhesive.

18. The optical cable assembly of claim 14, wherein the first subset of openings is in a central position of the array of openings.

19. The optical cable assembly of claim 14, wherein:
the outer jacket comprises an end portion proximate the end of the outer jacket; and
the end portion has an outer diameter that is less than an outer diameter of the outer jacket outside of the end portion.

20. The optical cable assembly of claim 19, wherein the first ends of the plurality of filler optical fibers are disposed between the end portion of the outer jacket and the securing member.

21. An optical cable assembly comprising:
a housing;
an optical cable comprising:
an outer jacket;
one or more buffer tubes disposed within the outer jacket, wherein the one or more buffer tubes extend beyond an end of the outer jacket; and
a plurality of active optical fibers disposed within the one or more buffer tubes, wherein the plurality of active optical fibers extend beyond an end of the one or more buffer tubes and at least a portion of the optical cable is disposed within the housing;
a plurality of filler optical fibers, each filler optical fiber comprising a first end and second end, wherein the first end is secured to an outer surface of the one or more buffer tubes by a securing member; and
a ferrule comprising an array of openings, wherein the ferrule is disposed within the housing, and ends of the plurality of active optical fibers are disposed within a first subset of openings of the array of openings and the second ends of the plurality of filler optical fibers are disposed within a second subset of openings of the array of openings.

22. The optical cable assembly of claim 21, wherein the securing member comprises an adhesive.

23. The optical cable assembly of claim 21, wherein the securing member comprises a heat shrink tubing.

24. The optical cable assembly of claim 23, wherein the securing member further comprises an adhesive.

25. The optical cable assembly of claim 21, wherein the first subset of openings is in a central position of the array of openings.

26. The optical cable assembly of claim 21, wherein the one or more buffer tubes comprises a plurality of buffer tubes, and a single active optical fiber of the plurality of active optical fibers is disposed within a single buffer tube of the plurality of buffer tubes.

27. A method of securing a ferrule to a plurality of optical fibers of an optical cable, the method comprising:
- stripping an outer jacket of the optical cable to expose a plurality of active optical fibers;
- reducing a diameter of the outer jacket at an end portion proximate an end of the outer jacket;
- securing ends of a plurality of filler optical fibers to the end portion of the outer jacket; and
- inserting the plurality of filler optical fibers and the plurality of active optical fibers into openings of the ferrule.

28. The method of claim 27, wherein reducing the diameter of the outer jacket is performed mechanically.

29. The method of claim 27, wherein securing the first ends of the plurality of filler optical fibers to the end portion of the outer jacket comprises applying a heat shrink tubing around the plurality of filler optical fibers and the end portion of the outer jacket.

30. The method of claim 27, wherein securing the first ends of the plurality of filler optical fibers to the end portion of the outer jacket comprises applying an adhesive around the plurality of filler optical fibers and the end portion of the outer jacket.

31. A method of securing a ferrule to a plurality of optical fibers of an optical cable, the method comprising:
- stripping an outer jacket of the optical cable to expose one or more buffer tubes;
- stripping the one or more buffer tubes to expose a plurality of active optical fibers;
- securing ends of a plurality of filler optical fibers to the one or more buffer tubes; and
- inserting the plurality of filler optical fibers and the plurality of active optical fibers into openings of the ferrule.

32. The method of claim 31, wherein securing the first ends of the plurality of filler optical fibers to the one or more buffer tubes comprises applying a heat shrink tubing around the plurality of filler optical fibers and the one or more buffer tubes.

33. The method of claim 31, wherein securing the first ends of the plurality of filler optical fibers to the one or more buffer tubes comprises applying an adhesive around the plurality of filler optical fibers and the one or more buffer tubes.

\* \* \* \* \*